May 6, 1941.　　　H. T. CLARK　　　2,241,057
CAPACITANCE COMPENSATOR

Filed Dec. 14, 1938

Inventor:
Hardin T. Clark,
by Harry E. Dunham
His Attorney.

Patented May 6, 1941

2,241,057

UNITED STATES PATENT OFFICE 2,241,057

CAPACITANCE COMPENSATOR

Hardin T. Clark, Schenectady, N. Y., assignor to General Electric Company, a corporation of New York Application December 14, 1938, Serial No. 245,686

3 Claims. (Cl. 175—41.5)

My invention relates to capacitance compensators by which compensation is automatically made for variations in the capacitance of a device or an apparatus with which it is used due to temperature changes. The object of my invention is to provide an improved capacitance compensator having the advantages that the capacitance change provided thereby has practically a linear relationship with the change in temperature; that a high ratio is obtained between the available linear compensating effect and the fixed capacity inserted in the circuit; that the construction is capable of a wide adjustment of capacitance change per degree of temperature change; and that the capacitor plates of the compensator maintain a constant spacing at all times and cannot come into contact with each other to produce a short circuit at temperature extremes.

My invention will be better understood from the following description taken in connection with the accompanying drawing, and its scope will be pointed out in the appended claims.

Figure 1:
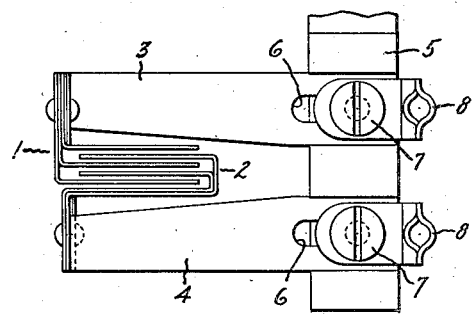
Figure 2:
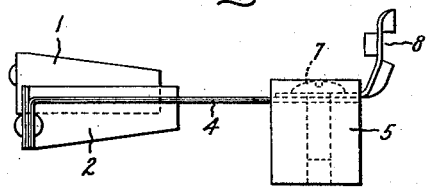

Referring to the drawing, Fig. 1 is a plan view of an embodiment of my invention and Fig. 2 is a side view thereof.

In the drawing 1 and 2 represent two groups of spaced parallel interleaved plates constituting a variable capacitor of relatively small maximum capacitance. Two groups of plates are mounted in such a manner that the spacing of the plates of one group from those of the other is maintained fixed but the groups of plates are movable relatively to each other in a direction parallel to their planes in response to temperature changes in the ambient. Each group of plates is shown mounted on and moved by a bimetallic strip, group 1 being shown riveted to the end of the bimetallic strip 3 and group 2 being shown similarly secured to the end of the bimetallic strip 4, the two strips being reversely arranged whereby an increase in temperature will cause the two groups of plates to move in opposite directions. I may, if desired, separately support the groups of plates in any well known manner and employ the bimetallic strips merely to move the plates so that they interleave a greater or lesser amount with changes in temperature.

The bimetallic strips are secured at their opposite ends to the fixed support 5 which for example may be of insulating material provided with slots which receive the ends of the strips and serve accurately to position them. The strips are shown having the slots 6 therein through which the securing screws 7 pass into the support. Between each strip and the screw head I have shown a terminal clip 8 by which the compensator may be connected into the circuit with whatever device or apparatus it is to be used for the compensation thereof. It will be seen that by loosening either screw 7 and adjusting the corresponding bimetallic strip to vary the amount of the strip which extends beyond the support, I am able to adjust the amount of overlap of the plates forming the two groups and hence to adjust both the amount of the initial capacitance and the compensating effect provided by the compensator. Also, by similarly adjusting both of the bimetallic strips whereby the amount of relative movement of the two groups of plates is varied with a given change in temperature I am able to vary the amount of compensation provided by the compensator without changing the amount of the initial capacitance.

If desired, I may secure one of the two groups of plates in fixed position, for example, by employing a supporting strip which does not flex with changes in temperature. However, I prefer to employ the construction shown and described whereby the two groups of plates move in opposite directions.

What I claim as new and desire to secure by Letters Patent of the United States is:

1. A capacitor compensator comprising a support, a plurality of spaced overlapping plates, means for securing said plates to said support including a bimetallic strip arranged in response to a temperature change to move one of said plates in its own plane in one direction to change the overlap of the plates and means by which one of said plates may be adjusted relatively to the other by movement thereof in a direction substantially at right angles to said direction thereby also changing the overlap of the plates.

2. A capacitor compensator comprising a support, a plurality of spaced overlapping plates, means for securing one of said plates to said support, a bimetallic strip for securing the other plate thereto and operative to move the plate in its own plane, said strip being operative in response to a change in temperature to move said other plate in its own plane in a direction to increase the overlap of the plates and means for adjustably securing said strip to said support whereby the position of said other plate may be varied in a direction substantially at right angles to said direction.

3. A capacitor compensator comprising a support, a plurality of spaced overlapping plates, a bimetallic strip secured to each of said plates for producing opposed movements thereof in their own planes in response to a change in temperature thereby varying said overlap, means by which said strips may be moved relative to said support to adjust said plates in a direction substantially at right angles to said direction and means for securing the strips to their supports in adjusted position.

HARDIN T. CLARK.